United States Patent
Athenstaedt

[11] 3,930,472
[45] Jan. 6, 1976

[54] COMPOSITE OIL-COOLED PISTON FOR AN INTERNAL COMBUSTION ENGINE

[75] Inventor: Gernot Athenstaedt, Hausen, Germany

[73] Assignee: M.A.N., Augsburg, Germany

[22] Filed: Sept. 11, 1974

[21] Appl. No.: 505,051

[30] Foreign Application Priority Data
Sept. 28, 1973 Germany............................ 2348870

[52] U.S. Cl. ............ 123/41.38; 92/186; 123/41.37
[51] Int. Cl.² ............................................ F01P 3/06
[58] Field of Search........... 123/41.34, 41.35, 41.36, 123/41.37, 41.38, 41.39; 92/186

[56] References Cited
UNITED STATES PATENTS

| | | | |
|---|---|---|---|
| 1,856,107 | 5/1932 | Mellor | 123/41.38 |
| 2,407,429 | 9/1946 | Kuttner | 123/41.37 |
| 2,442,408 | 6/1948 | Graham | 123/41.38 |
| 2,687,931 | 8/1954 | Flynn | 123/41.35 |
| 2,742,883 | 4/1956 | Smith | 123/41.38 |
| 3,204,617 | 9/1965 | Hulbert | 92/186 |

*Primary Examiner*—Charles J. Myhre
*Assistant Examiner*—Daniel J. O'Connor
*Attorney, Agent, or Firm*—Flynn & Frishauf

[57] ABSTRACT

The piston head is hollowed for a central coolant cavity and for an outer annular coolant cavity separated by a ridge by which the head is supported on the piston body. An outer shoulder also supports the skirt part of the head on the piston body. The piston body has an upper part hollowed in the center to form part of the central coolant cavity and a lower part having a wrist pin bearing with coolant recesses in the bearing, which are connected by coolant channels leading to the annular cavity in the head. The wrist pin in the bearing has channels connecting a coolant supply channel in the piston rod to the center of the wrist pin and thence to the bearing recesses.

15 Claims, 4 Drawing Figures

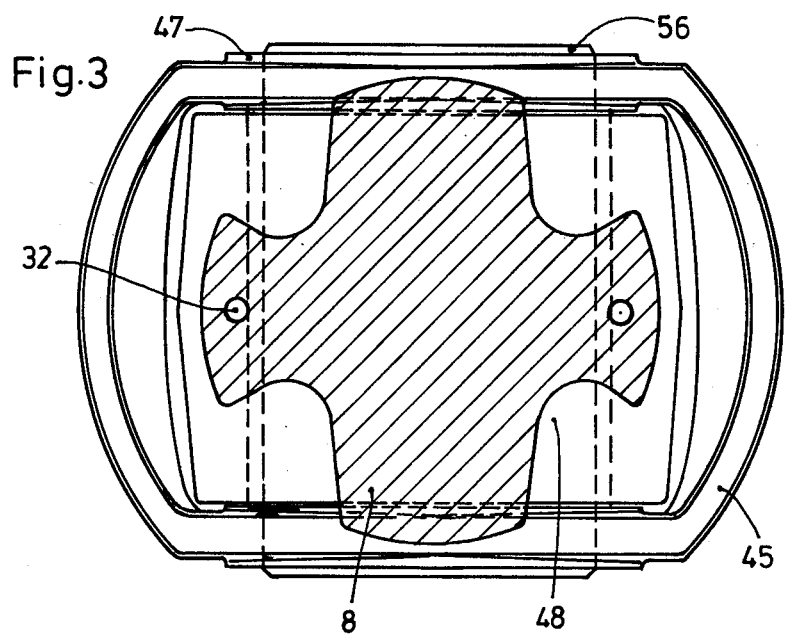
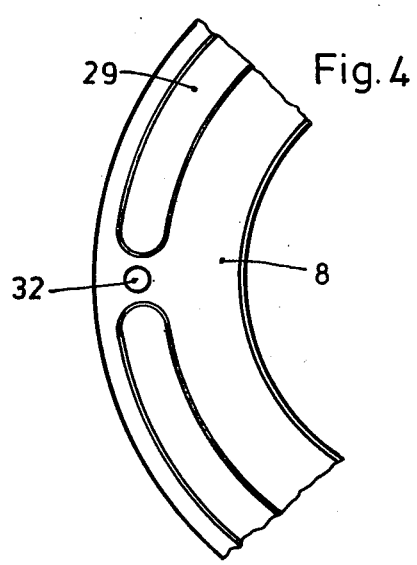

COMPOSITE OIL-COOLED PISTON FOR AN INTERNAL COMBUSTION ENGINE

This invention relates to an oil-cooled composite piston for an internal combustion engine, particularly a large diesel motor. Such composite pistons have a piston head comprising a piston face and a piston skirt portion on which the piston rings are seated, and also a piston body fastened to the piston head and having a bearing for the piston wrist pin which is fastened to the piston rod. The piston body carries sliding surfaces to slide on the cylinder walls to maintain the piston axis aligned with the cylinder axis.

It is the object of the present invention to provide such a composite piston for an engine such as a large diesel motor which will be light in construction and nevertheless have a long useful life by virtue of taking up the stresses of thermal and mechanical loading in the most favorable manner.

SUBJECT MATTER OF THE PRESENT INVENTION

Briefly, the piston head is provided with an annular support ridge on its underside separated from the piston skirt that carries the piston rings by an annular cooling cavity. Inside the support ridge is a central cooling cavity. The piston body on which the piston head is carried has an upper part of approximately hollow cone shape with an upper surface on which the annular ridge of the piston head is supported directly and the central hollow contributes to the size of the aforesaid central cooling cavity. The lower part of the carrier body has a wrist pin bearing including a load bearing surface and coolant recesses in or adjacent to the load bearing surface. Various kinds of sliding members may be attached to, pivoted on or formed integral with the carrier body. The piston wrist pin is fastened to the piston rod on its surface farthest from the load surface of the bearing. The oil coolant is provided through a supply channel in the piston rod, then through a channel in the wrist pin distributing oil to the recesses in the bearing, as well as to some other parts of the wrist pin for cooling the same. Coolant channels through the piston body extend from the recesses to the annular cooling cavity and the coolant flows from there to the central cavity through a connecting channel and finally from the central cavity to the exterior of the piston through an outlet. The coolant channel leading from the piston rod to the recesses is made up of channel portions lying in a plane through the piston axis and directed at an angle of 30° to 60° to the piston axis. These include a channel from the channel in the rod to the central part of the wrist pin and channels from the central part of the wrist pin to the recesses.

The channels for the coolant leading from the recesses to the annular cavity are preferably straight and inclined at an angle between 0° and 25° to the piston axis. Such a form of piston construction has the advantage that the coolant is dispatched in the shortest path to the thermally highly loaded region of the piston and is delivered directly to the cooling spaces in the edge portion of the piston head. It is particularly advantageous to provide a connecting channel between the annular cooling space in the piston head edge zone and a central cavity and then to complete the path of the coolant by an outlet to the piston exterior from the central cavity. In this manner the coolant can be evenly distributed over the entire piston head and the lubricating oil which serves as the coolant can provide a quick heat exchange operation when it flows back into the crank case.

According to a further development of the invention, a form of piston is provided in which the sliding surfaces below the ring bearing portion of the piston head are provided on a pivoted skirt frame bored for fitting over the ends of the wrist pin. With this construction, the result is obtained that when the sliding surfaces become impaired, as ultimately from piston wear, an easy and economic enlargement of this skirt structure can be made. Moreover, this type of sliding structure can accommodate itself better to the cylinder barrel, since it can seek its best running position. By the construction of the sliding skirt members as separate units, the possibility is offered to make the sliding surfaces of a material particularly selected for its good running properties. Such a material, for example, is Aluminium.

It is also particularly advantageous for the piston wrist pin to be seated directly in the material of which the carrier body of the piston is made. Since aluminum and aluminum alloys are the preferred materials for the piston body and these materials have very good running qualities, the possibility is thus presented by the invention to do away with the previously provided bearing layers and to have the wrist pin bear directly against the carrier body.

The invention is further described by way of example with reference to the accompanying drawings, in which:

FIG. 3 is a cross-section along the line III—III of FIG. 2, and

FIG. 4 is a view of a portion of the piston in the direction of the arrow Z of FIG. 2.

Figure 1:
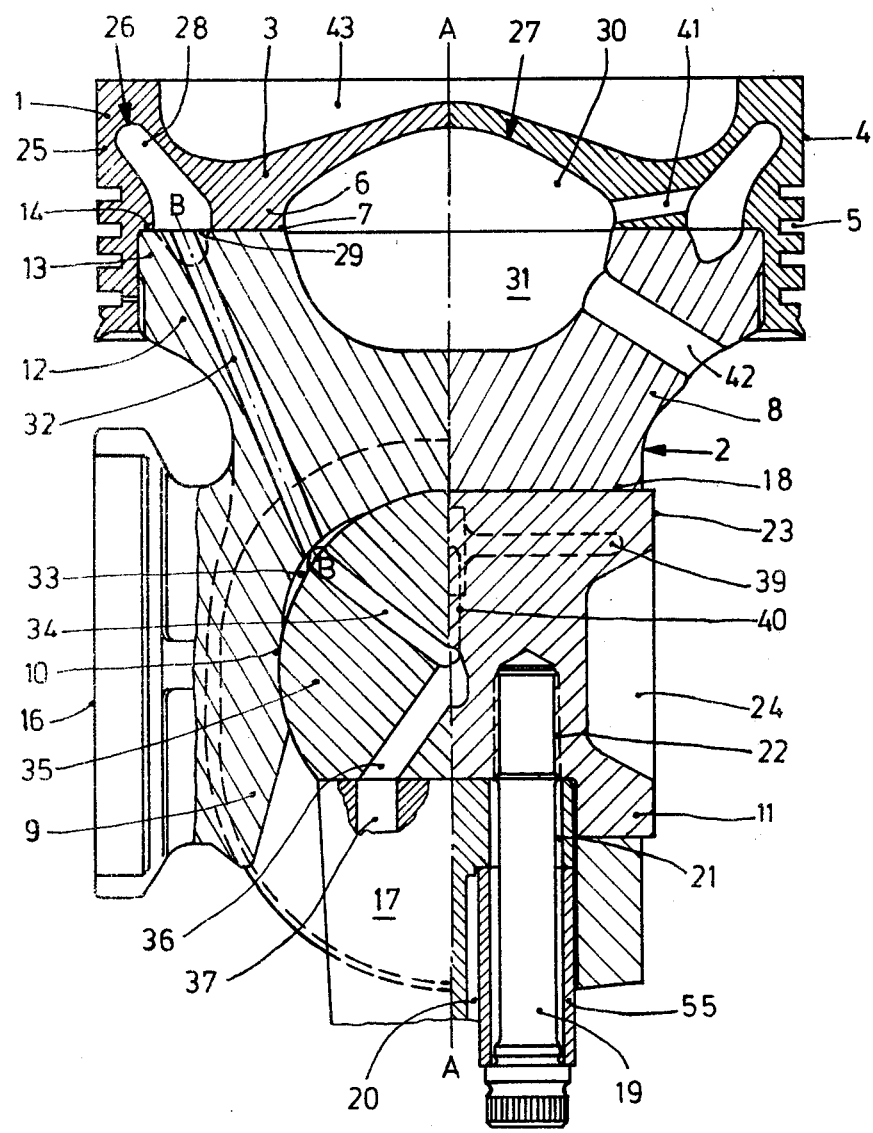
FIG. 1 is a longitudinal section of a piston in accordance with the invention, the sections on the two sides of the center line A—A being taken at right angles to each other.

The piston shown in FIG. 1 comprises a piston head 1 and a piston body 2. The piston head 1 is made of steel and may, if desired, be made of cast steel. It has a piston face member 3 connected to an upper piston skirt portion 4. Several grooves 5 for seating piston rings (not shown) are provided on the periphery of the piston skirt portion 4. On the underside of the piston face member 3 is a ring shaped projection 6 concentric with the longitudinal axis A-A of the piston and ending in the horizontally disposed mounting surface 7 at its lower extremity.

The piston body member 2, made of aluminum or an aluminum alloy, comprises a carrier portion 8, the lower part 9 of which provides the bearing seat 10 for a piston pivot pin 11. On the lower section 9 of the carrier portion 8 of the piston body, there is formed an annular upper section 12 of the carrier portion 8 spreading upward in the shape of a hollow cone concentric with the longitudinal axis A—A of the piston. On this conically spreading upper section 12 of the carrier portion 8 of the piston body is supported the piston head 1 resting on the support surface 7 of the annular ridge 6. The piston head 1 is fitted and centered at and near its skirt portion 4 by an outer annular projection 13 at the edge of the upper section 12 of the carrier portion 8. The piston head also rests on the annular projection 13 with a shoulder 14 provided for the purpose. Sliding members 15 are provided on the carrier portion 8 of the piston body and their sliding surfaces 16 are separated by a gap from the upper skirt portion of the piston forming part of the piston head, which provide the structure for the sliding seal between the piston and the cylinder. The sliding surfaces 16 may be coated with a material having good antifriction properties. The sliding members 15 which together form a sort of lower piston skirt, can if desired be removably connected to the carrier portion 8 of the piston body by screws constituted as expansion bolts.

As may be seen from FIG. 1, the bearing 10 for the wrist pin 11 has an end support bearing shell surface 18 running through at the side opposite the place of connection of a piston rod 17. The piston rod 17 is connected to the wrist pin 11 by means of two screws 19 of the expansion bolt type. The screws 19 extend through cavities 20 and bores 21 in the piston rod 17 and engage threads 22 in the wrist pin 11 of the piston. The heads of the screws 19 bear against guide bushings 55 provided in the cavities 20 of the piston rod 17. The piston pivot pin 11 is seated directly in the material of the carrier portion 8 of the piston body 2 and, for the purpose of weight saving, has inwardly extending cavities 24 at its ends 23.

For cooling the piston, which is accomplished in this example with circulation of oil, an outer annular cooling space 26 and a central cooling medium chamber 27 are provided by the manner in which the piston head 1 and the piston body 2 fit together. The outer annular cooling channel 26 is close to the edge zone 25 of the piston head 1. FIG. 4 shows that the cavities 29 in the piston body 2, as distinguished from the cavities 28 in the piston head 1, do not go completely around the piston but rather a little short of halfway round.

The central coolant reservoir 27 is formed of the cavities 30 in the piston head and the cavities 31 in the piston body. Coolant passages 32 run from the outer annular cooling space 26 to the bearing 10. The mouths of these coolant passages 32 facing the piston head are provided in between the ends of the semicircular cavities 29, as shown in FIG. 4. The passages 32 are straight and have axes at an angle of 25° to the longitudinal axis of the piston, so that they pass completely through the carrier portion 8 of the piston body 2. Alternatively, smaller angles than 25° may also be used, down to 0° (i.e. passages parallel to the piston axis).

The coolant passages 32 at their lower ends open into the pockets 33 provided in the bearing 10. Passages 34 bored in the wrist pin 11 of the piston at an angle of between about 30° and 60° to the piston axis also open into the recesses 33. Just as in the case of the passages 32, there are two passages 34 in the same longitudinal plane of the piston. In the central portion of the wrist pin, the passages 34 connect with a passage 36 which has a somewhat larger diameter in the vicinity of the connection with the passages 34, narrowing down somewhat therefrom. The passage 36 runs diagonally from the middle of the wrist pin with its axis in the same plane 35 that contains the axes of the passages 34 and connects with the feed passage 37. Distribution capillaries 39 and 40 are provided internally of the wrist pin 11 for the oil serving as coolant. The distribution channels 39 and 40 do not extend into the walls of the wrist pin lying opposite the bearing surface 18.

The outer annular cooling space 26 connects with the central coolant reservoir 27 through a coolant channel 41. Still another channel 42, which is the coolant outlet matched with the inlet 37, connects the cooling spaces of the piston with the space lying outside the piston.

A piston of the type described, built out of several parts, provides a great deal of freedom in the choice of the material to be used in its construction, which can be selected from the standpoint of a favorably lightweight and a high of degree of sturdiness. The construction of the wrist pin 11, connected to the piston rod 17, is such that the driving forces can be transmitted without significant deflection from the combustion chamber 43, through the piston body 2 to the wrist pin 11 and then to the piston rod 17. Consequently, the wrist pin 11 is not subjected to a bending stress. A balanced distribution of the hydrostatic bearing pressure results and, accordingly, there is a favorable loading of the bearing. Since the piston is subdivided into a sealed portion and a guiding portion, the latter having sliding members, the piston also is distinguished by having a relatively low weight. This subdivision of the piston, moreover, reduces the heating of the sliding members 15 from the heat of the combustion chamber 43 to a very small amount. No great temperature differences therefore appear on the sliding surfaces 16. Cylinder wall distortions and uneven wear of the cylinder walls, as well as uneven thermal expansion, can be compensated for by the flexible construction of the sliding members 15. In addition, it is possible to keep the amount of play of the sliding members in the cylinder quite small. As the result of the small play of the sliding members 15, the cavitation distortion on the water side of the cylinder wall is reduced.

Sufficient cooling and lubrication are dominant factors in lengthening the useful life of a piston. Accordingly, the oil is supplied from the crank case by an oil pump, not shown in the drawings, through a hollow crankshaft, likewise not shown, through the feed passage 37 in the piston rod 17 and through the wrist pin 11 and the passages 36 and 34 there provided, as well as the distribution channels 39 and 40, to the recesses 33 and 38 in the bearing 10. The oil then reaches the outer annular cooling space 26 by passing through the coolant passages 32 and from there, finally reaches the coolant reservoir 27. An outlet passage 42 assures that cooling or lubricating oil flows back into the power transmission space. Rapid heat exchange is obtained by the flowing back of the cooling oil. Lubrication of the sliding surfaces 16 is obtained by the oil sprayed at high velocity by the crankshaft. Lubrication of the wrist pin 11 is accomplished through the distribution channels 39 and 40 and the recesses 33 and 38.

Figure 2:
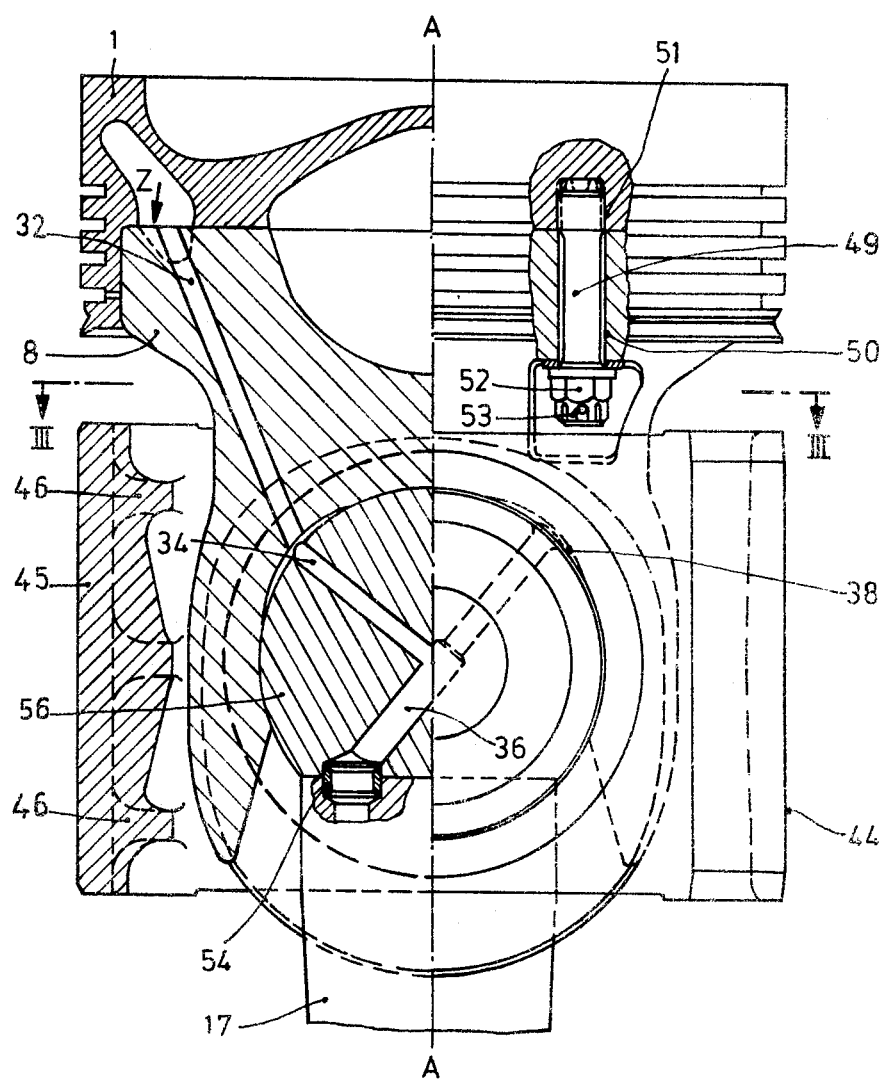
FIG. 2 is a view partly in longitudinal section and partly in elevation of another example of a piston in accordance with the invention, the elevation view being partly broken away.

FIG. 2 shows a different embodiment of the invention in the form of an alternative construction of a piston that may be used instead of the piston described in FIG. 1. In basic construction and in function, the piston of FIG. 2 is constituted the same way as that of FIG. 1. The difference is merely that the sliding surfaces, here designated 44, are provided in the form of a single boxlike sliding body, designated 45. This sliding body 45 can be made of a different material than the carrier portion 8 of the piston body. It is provided with reinforcing ribs 46 located internally behind the sliding surfaces 44. These reinforcing ribs 46 are useful because the sliding body 45 is made as light as possible and tends to be too yielding at the surfaces 44. This problem can of course also be solved by making the part of the body that carries the surfaces 44 thicker and stronger. The sliding frame body 45 is mounted movably on the carrier portion 8 of the piston. For this purpose, as shown in FIG. 3, the sliding frame body 45 is provided with bores 47 in the neighborhood of the piston's wrist pin, here designated 56, into which the wrist pin 56 protrudes with its outer ends 23 (FIG. 1).

As may also be seen from FIG. 3, the carrier portion 8 of the piston body has a cross-sectional shape somewhat in the form of a maltese cross. Screws 49 (FIG. 2) are provided in the cavities 48 (FIG. 3) that are formed in this construction of the carrier portion 8 of the piston body. As shown in FIG. 2, the screws 49 fasten the piston head 1 and the carrier portion 8 of the piston body together at a level above the plane of the cross-section shown in FIG. 3, so that the heads of the screws can be reached through the cavities 48 in that cross-section. This arrangement of screws and of securing the piston head in place is the same in both forms of piston heads illustrated herein.

The screws 49, as shown in FIG. 2, are provided in the form of stud bolts and pass through bores 50 in the carrier portion 8 of the piston body to engage threads 51 tapped in the piston head 1. For tightening these two parts together, a castellated nut 52 is fitted on the screw 49 secured in place by a splint pin 53.

FIG. 2 also shows that a shell 54 is provided for fastening the wrist pin 11 to the piston rod 17.

In contrast to the fixed sliding members 15 described in FIG. 1, the movable sliding frame 45 has certain additional significant advantages that are still to be mentioned. Since this sliding-surface frame 45 is movable, it can seek its best running position in the cylinder. When the cylinder ultimately suffers some wear, since the sliding body is removable, only the sliding body frame 45 needs to be built up. Since in the case of the movable sliding frame body 45 the piston head 1 is centered by oil forces in the gap between the piston ring seats and the cylinder, and its position is hardly changed at all by replacement of the framelike sliding body 45, the piston ring groove wear and the wear of the piston rings themselves, is very low.

Although the invention has been described by reference to particular illustrative embodiments, it will be understood that modifications and variations are possible within the inventive concept.

I claim:
1. A composite oil-cooled piston for an internal combustion engine, comprising:
 a piston head (1) having a piston face and a piston skirt with seating means for piston rings, said piston head having an annular support ridge (6) on its underside separated from said piston skirt by an annular cooling cavity (29) and surrounding a central cooling cavity (27);
 a piston carrier body (8) having an upper part (12) of approximately hollow cone shape having an upper surface (7) on which said annular ridge (6) of said piston head is directly supported, the hollow center of said upper part forming said central cooling cavity (27) with said piston head, said carrier body (8) further having a lower part (9) having a wrist pin bearing (10) therein including a load bearing surface (18) and providing coolant recesses (33,38), said carrier body having coolant channels respectively connecting said recesses with said annular cavity, and
 a piston wrist pin (11,56) in said bearing and a piston rod (17) fastened to said wrist pin on a surface opposite the load surface (18) of said bearing (10), said piston rod having an interior coolant supply channel (37) and said wrist pin (11,56) having channels therein (34,36) with axes in a plane (35) passing through the piston axis (A—A), said channels all being oblique to said axis at angles between 30° and 60°, and providing coolant paths from said supply channel in said piston rod to said recesses.

2. A composite piston as defined in claim 1 in which said wrist pin (11,56) is provided with coolant distribution channels (39,40) for cooling said wrist pin which do not penetrate into the layer of said wrist pin bearing against said bearing surface (18).

3. A composite piston as defined in claim 1 in which said piston head is provided with an annular shoulder (13) adjacent to said piston skirt for supporting said piston head on the edge of said carrier body (8).

4. A composite piston as defined in claim 1 in which said coolant channels (32) between said recesses (33,38) and said annular cavity (26) are straight and run at an angle between 0° and 25° to the axis of said piston.

5. A composite piston as defined in claim 1 in which connection channel means (41) are provided for circulation of coolant between said annular cavity (26) and said central cavity (27) and in which said central cavity (27) is provided with at least one outlet channel (42) to the exterior of the piston.

6. A composite piston as defined in claim 1 in which said carrier body (8) is provided with integral sliding members (15) on its periphery.

7. A composite piston as defined in claim 1 in which sliding members (15) are removably fastened to said carrier body (8) by expansion screws.

8. A composite piston as defined in claim 1 in which a sliding skirt member in frame form (45) is pivotally mounted on the outer ends of said wrist pin (56).

9. A composite piston as defined in claim 1 in which said wrist pin (11, 56) and said piston rod (17) are fastened together with expansion screws.

10. A composite piston as defined in claim 1 in which said piston head is made of steel.

11. A composite piston as defined in claim 1 in which said carrier body (8) is made of a metal consisting principally of aluminum.

12. A composite piston as defined in claim 1 in which said wrist pin (11,56) bears directly against the material of which said carrier (8) is made.

13. A composite piston as defined in claim 1 in which said piston head (1) and said carrier body (8) are demountably fastened together by screws (49).

14. A composite piston as defined in claim 8 in which said sliding skirt body (45) is provided with reinforcing ribs (46) on its interior opposite the sliding surfaces (44) thereof.

15. A composite piston as defined in claim 1 in which tapered and inwardly extending cavities (24) are provided on both ends (23) of said wrist pin (11,56).

* * * * *